Patented Feb. 13, 1934

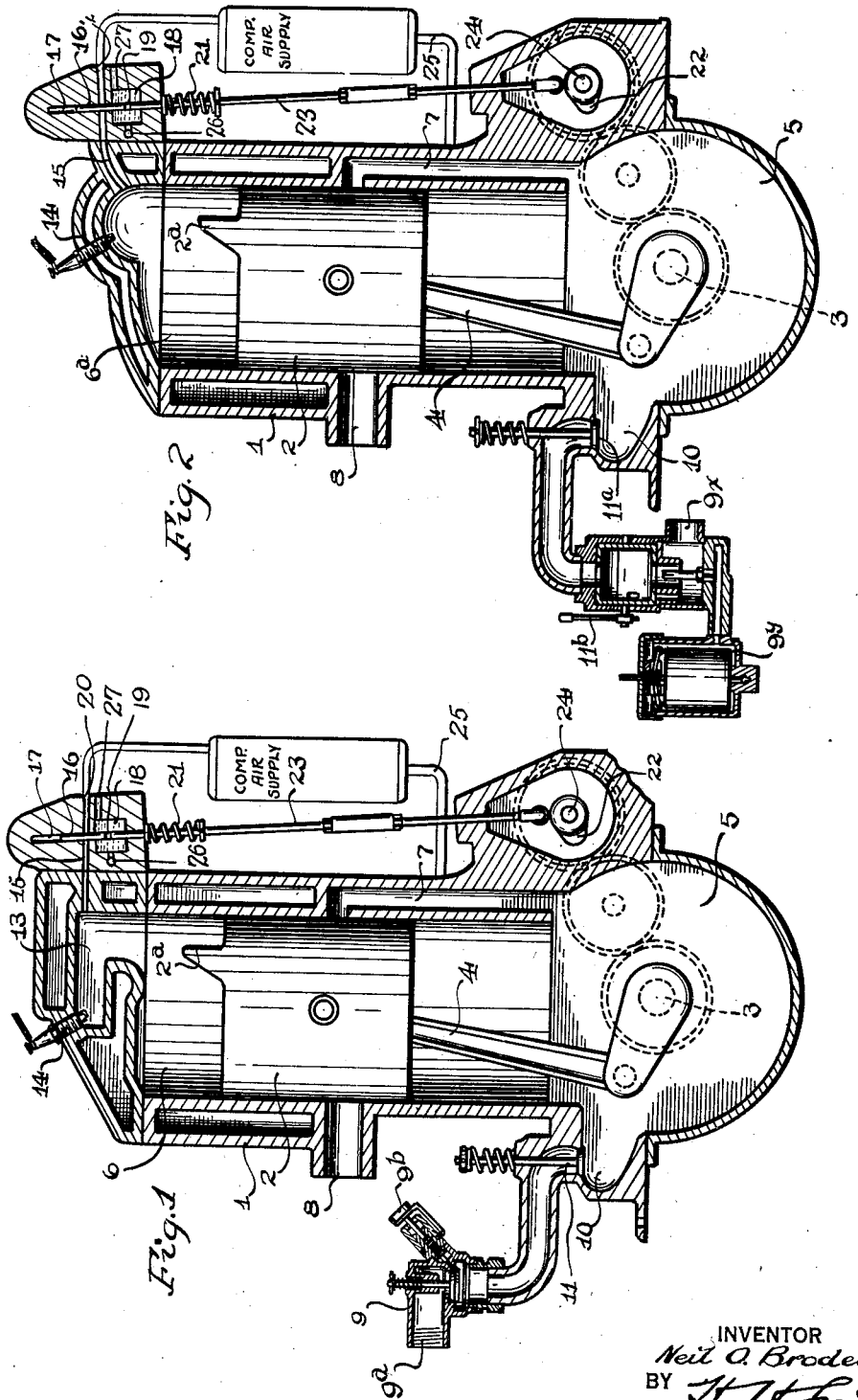

1,947,375

UNITED STATES PATENT OFFICE 1,947,375

METHOD OF OPERATING AN INTERNAL COMBUSTION ENGINE AND AN ENGINE EMPLOYING SUCH METHOD

Neil O. Broderson, Rochester, N. Y.

Application January 30, 1929. Serial No. 336,246

16 Claims. (Cl. 123—32)

The present invention relates to a method of operating internal combustion engines and an engine employing such method. An object of the invention is to obtain greater economy in that type of engine in which fuel is injected under pressure into a combustion space containing air or a mixture of air and fuel under compression and then exploded or ignited. A further object of the invention is to govern the power output of an engine of this type without at the same time varying the amount of fuel injected under pressure.

To these and other ends, the invention consists of certain parts and combinations of parts, all of which will be hereinafter described: the novel features being pointed out in the appended claims.

In the drawing:

Fig. 1 is a sectional view of an engine which employs one embodiment of my invention; and Fig. 2 is a sectional view of an engine which employs another embodiment of my invention.

In this invention, fuel charges of a fixed or constant amount are introduced under pressure into a combustion chamber containing a compressed mixture of fuel and air or air only and are then fired or ignited. In one illustrated embodiment shown in Fig. 1, the varying power requirements of the motor are met by varying the amount of fuel in the compressed mixture into which the constant fuel charge is forced, whereas, in another illustrated embodiment as shown in Fig. 2, the varying power requirements are met by varying the amounts of fuel and the air forming parts of the compressed mixture into which the constant amount of fuel is forced.

In the embodiment illustrated in Fig. 1, the invention is shown as being carried out by a two cycle engine but it will be understood that it is not limited to this type of engine.

As shown, 1 indicates the casing and 2 a piston which reciprocates in the casing and is operated through a crank shaft 3 by means of a pitman 4, the piston providing a crank case and compression chamber 5 on one side and a combustion chamber 6 on the other side. The compression chamber 5 connects with the combustion chamber 6 by a passageway 7 formed in the wall of the casing 1 to conduct a fuel and air mixture from the chamber 5 to the combustion chamber 6 when the piston is in its lowest position. A deflector 2ª is provided on the compression face of the piston to direct the fuel so that it will not mix with the exhaust gases leaving by the exhaust opening 8.

In the embodiment illustrated in Fig. 1, a vaporizer or carburetor 9 of any desired construction, with a fixed or constant air opening 9ª and an adjustable fuel supply valve of known or desired construction as 9ᵇ variable with the power requirement of the motor, connects with the inlet 10 which leads to the crank chamber 5, a check valve 11 being provided in said inlet 10 to prevent compression in the crank case being communicated to the vaporizer or carburetor.

The injected or pressure fed fuel supply is led by a passage 15 to the pocket or auxiliary firing chamber 13, to-wit, to a localized zone in the immediate vicinity of the spark plug or firing device 14, so that as the fuel enters the chamber 13, or the localized zone in the vicinity of the spark plug, it becomes stratified or pocketed in said chamber due to the fact that the fuel and air mixture in the main, or main portion of the combustion chamber is under the same compression.

Control of the injected or pressure fed fuel through the passage 15 is effected, in this instance, by a measuring device comprising a slide 16 operating in a fuel chamber 17 extending transversely of the passageway 15 and communicating with a fuel chamber 18 in which the slide also operates. The slide has a port 19 which is adapted to be brought into alinement with the passage 15 and also with a passage 20 through which air under pressure is supplied. When the port 19 is moved to the chamber 18 it collects a fixed or constant amount of liquid fuel which is lifted to the passage 15 where the air from the passage 20 forces said fuel into the pocket 13 under pressure. The fuel in the chamber 18 is circulated to carry off air and the chamber is maintained substantially full of the fuel.

The compressed air relied upon to force the ignition fuel into the cylinder when the port 19 of the slide 16 is brought into alignment with passageway 20 is supplied to and through the passageway 20 from any suitable source associated with the engine, for example from a compressed air supply tank into which the air is forced as by any suitable air compressor (not shown) driven from the crank shaft of the engine and which air compressor is connected so as to supply the compressed air to the compressed air supply tank through the pipe 25. In the drawing there is indicated at and by 26 the gasoline supply or inlet for the well or fuel chamber 18 and at and by 27 the outlet or release line for the return to the main fuel supply of excess fuel and it will be appreciated that the circulating of fuel through the well 18 serves to conduct away through the outlet 27 any compressed air which may tend to otherwise collect in the well 18 from the normal functioning of the slide having the port 19 and which port returns to the well 18 filled with air as the result of the displacement of fuel by compressed air incident to the forcibly ejecting of ignition fuel into the engine cylinder. The circulation of ignition fuel through the well or fuel chamber 18 may be accomplished in any one of several ways, for example one of which may be accomplished by a fuel circulating pump associated with and driven from the engine main shaft. For the purpose of the present invention however it is not necessary to illustrate the means whereby fuel is maintained in the well or fuel chamber 18 and therefore merely the inlets and outlets for this fuel chamber have been indicated even though the specification has previously referred to the fact that in this chamber 18 a circulation of fuel is maintained.

Movement of the slide 16 may be effected in any suitable manner. In this instance, it is normally moved to the chamber 18 by a spring 21 and is moved in the other direction by a cam 22 which engages the lower end of a plunger 23 connected to the slide 16. The cam 22 is arranged on a shaft 24 which is operated in timed relation to the crank shaft so as to feed slightly in advance of the ignition the fixed or constant charge of fuel to the chamber 13 when the piston 2 is on the compression stroke, compressing the fuel and air mixture in the combustion chambers 6 and 13.

The pocket 13 should have an area so proportioned to the main combustion space as to develop at least sufficient power to idle the motor while admitting no fuel to the main combustion space. The amount of fuel delivered by the measuring feeding device should be so proportioned to the area of the pocket as to give the best firing mixture, allowing for some overflow to the main combustion space.

On the feeding of the fixed charge, the latter becomes stratified in the pocket 13 and ignition of the fuel in the chamber 13 takes place. This raises the compression in the pocket 13 a number of times, depending on the quality of the mixture and the turbulence, but due to the connection of this pocket with the main combustion space, the rise in compression will be distributed throughout the total combustion space, and this rise in compression together with the fire passing from the pocket will ignite any mixture strength admitted to the main combustion space and will make possible the burning of weak or slower burning mixtures at a higher rate of speed than has been heretofore possible, giving economies under part loads not possible in prior constructions. While this embodiment of the invention is shown and described in a two cycle engine, it is not limited to this type.

In the embodiment shown in Fig. 2, a form of the invention is shown which it is advisable to use in two cycle engines only. The illustrated construction of this embodiment is the same as that shown in Fig. 1 except that there is no stratifying pocket in the cylinder into which the fixed or constant fuel charge is injected. Instead, the fuel charge is injected directly into the main combustion space 6ª. Stratification of the fuel is not so desirable in this construction. Further, instead of a vaporizer with a fixed air supply being connected to the inlet 10, a vaporizer of known construction is employed having a variable air supply 9ˣ and a variable fuel or gas supply 9ʸ. The varying of the air and fuel supply is accomplished by means of a valve with hand controlled lever 11ᵇ before the mixture passes the check valve 11ª.

In this form of the invention a two cycle engine is obtained in which the explosive mixture is fired by a spark plug and in which the power output can be varied to suit the load demands by varying the amount of air and fuel delivered to the combustion space before the injection of a fixed or constant amount of fuel under pressure. It will be noted that according to the invention as illustrated by Fig. 2 that the fixed or constant amount of fuel under pressure through the passageway 15 is delivered in a relatively localized zone which is in the immediate vicinity of the sparking effects of the spark plug or firing device 14 and that as a consequence of this a relatively rich and explosive mixture exists in the zone under the direct firing influence of the spark plug whereby ignition is insured which can cause a resultant rising compression throughout the leaner mixture which is in and fills the main portion of the combustion chamber and there is thereby insured the proper combustion of the leaner mixture during the working stroke of the piston for the particular combustion chamber.

Previous to this invention the principle of delivering fuel to an internal combustion engine by the injection system has been confined to Deisel engines which operate on low volatile fuels, which fuels are difficult to vaporize.

In engines of the Deisel principle, the fuel must be injected into very high compressions, 500 pounds, or thereabouts. Not only has the injection system been called upon to deliver its charge of fuel into these high compressions, but it has been necessary to so design the same as to deliver varying amounts of fuel, depending on the power output required of the engine.

Extreme difficulty has been found in designing an injection system that would answer the above requirements and work satisfactorily at high speeds. Consequently little or no thought has been given to the use of injection system on the now highly perfected lower compression internal combustion engine using the high volatile fuels which are now adding the fuel to the intake air by means of carburetion.

This invention simplifies injection problems by delivering a uniform quantity of fuel at all times, making it possible to obtain the same quantity of fuel, regardless of the speed of the engine. The form of the device shown is one of many possible ways of accomplishing the result. The accomplishment of the above is further simplified by application to engines of moderate compressions.

The advantage of this invention as embodied in the construction shown in Fig. 1 are:

(a) greater economy in both two and four cycle engines; and (b) improved flexibility of control of two cycle engines.

This is accomplished in the following manner:

Air to the engine is not throttled whether operating at full load or part loads. Because the fuel is injected into auxiliary combustion space in advance of ignition and in a localized zone or section in the immediate vicinity of the spark plug or firing device, the greater amount of this localized fuel will have remained in this section of the combustion space until firing takes place, thus causing what may be termed stratification of the fuel. If pure air only has been admitted to the engine through the intake port, or valve, the main section of combustion space will contain principally compressed air at the time explosion takes place in the auxiliary combustion space, so that a relatively weak mixture of fuel for the total amount of air heated in both sections of the combustion space is burned. Furthermore, as the flame temperature and compression in the auxiliary combustion space are distributed over the additional air and space of the total combustion space, the maximum flame temperature will be greatly reduced, which means less loss by radiation to cooling water, etc., cooler exhaust gases and consequently less waste. The admission of a full charge of air at low, or part loads, insures high compression with the consequent burning of weaker fuel mixtures than is now possible with the present method of throttling which necessitates very rich mixtures for proper combustion at low or part loads.

Throttling an engine using this embodiment of the invention is not necessary unless the auxiliary combustion space and the fuel admitted by injection is so designed that it delivers more power than necessary to carry the friction load of the engine, in which case throttling, or retarding the spark, may be used to bring the engine to the desired idling speed.

To increase the power output, fuel is added to the intake air by means of a vaporized, or carburetor, without the usual compensating device. The more power required, the more fuel, and the latter is added until the point is reached, giving the best firing mixture in total combustion space. At low loads, the mixture in the main combustion space or in the main portion of the combustion space would be too weak to be ignited by a spark plug and if successfully ignited, would burn too slowly to deliver satisfactory power. However, with this method the combination of the flame and the increased compression from the explosion in the auxiliary combustion space will enable the weakest mixtures to be burned rapidly in the main combustion space.

The advantages of this method may be summarized as follows; heating greater quantity of air with given amount of fuel at part loads; and burning fuel at full compression when operating at lower or part loads, thus using weaker mixtures.

In addition to the above, this method has a special advantage to the two cycle engines as by admitting a full charge of air at all times it insures crank case compression, preventing back firing in the base. The injection system insures the proper firing mixture in the vicinity of the ignitor at all times, thus giving to the two cycle engine the flexibility which it lacks today.

*Embodiment shown in Fig. 2*

The embodiment shown in Fig. 2 applies to engines of the two cycle principle only.

The throttling of the two cycle engine may be effected in the present known conventional manner in which a well known rotary throttle valve $9^u$ is controlled by the operator through an arm $9^v$. A uniform quantity of fuel is injected directly to the combustion space which can be of conventional design without the auxiliary pocket. When the engine is throttled, the quantity of fuel injected at all times must be sufficient to produce a rich mixture to fire when the motor is throttled to the point of idling. As the air throttle is opened, admitting more air, the rise in compression will be proportionate to the amount of air admitted. This increase in compression will enable the burning of a weaker charge. Therefore, the fuel admitted by injection will take care of the increase in power needed simply by the addition of air until such a time as the amount of air admitted is too great for the quantity of fuel injected, causing a weak mixture. When this point is reached, additional fuel may be added to the air intake by means of carburetion, the carburetor $9^y$ used having a jet $9^w$ which will start to function at the time the additional fuel is required. This supplementary fuel added to the air intake will enable the engine to be operated at its full power output.

The advantage of this method is the assurance of the proper firing mixture in the neighborhood of the ignitor at low loads. Also at low loads, the charge in the base is incombustible and should any of the firing charge pass through the intake port connecting the base compression with the combustion space, which is a common occurrence in two cycle engines, the resultant explosion in the base will not take place.

This method gives to the two cycle engine greater flexibility, more uniform firing at low speeds than is now possible with the present method of operating two cycle engines.

What I claim as my invention and desire to secure by Letters Patent is:

1. The method of operating internal combustion engines which consists in adding fuel charges of a fixed or constant amount under pressure to successive compressed air-containing charges in the combustion chamber of the engine to cause such added fuel charges to stratify in the compressed air containing charge, and igniting the compressed added charge to cause it to burn and ignite the air containing charge.

2. The method of operating internal combustion engines which consists in collecting in a combustion chamber, successive compressed air-containing charges, adding to the successive compressed air-containing charges fixed or constant charges of fuel under pressure to cause stratification of the added fixed charges, and igniting the compressed mixture in the added stratified portion to cause the latter to burn first and then burn the air-containing charge.

3. In an internal combustion engine, the combination with a combustion chamber, of means for supplying successive air and fuel-containing charges to the combustion chamber for compression therein in variable proportions corresponding to the varying power requirements of the engine, means for supplying to successive air and fuel-containing charges while under compression, successive fixed fuel charges, and means for igniting the successive combined charges while under compression.

4. In an internal combustion engine, the combination with a combustion chamber, of means for supplying successive air- and fuel-containing charges to the combustion chamber for compression therein, means for supplying to successive air-containing charges while under compression, successive fixed fuel charges, under pressure and means for igniting the combined charges while under compression.

5. In an internal combustion engine, the combination with a combustion chamber, of means for supplying successive air- and fuel-containing charges to said chamber for compression therein, said means having devices for varying the proportions of air and fuel in the charges to correspond with the varying power requirements of the engine, means for supplying to successive air-containing charges while under compression, successive fixed fuel charges under pressure, and means for igniting the successive combined charges while under compression.

6. In an internal combustion engine, the combination with a combustion chamber having a pocket constantly open to the combustion chamber, of means for supplying successive air-containing charges to the chamber for compression therein, means for supplying to successive air-containing charges while under compression, successive fixed fuel charges under pressure to cause the fuel charges to stratify in the constantly open pocket, and means for igniting the fuel charges stratified in the pocket to cause the burning of the latter and the burning of the air-containing charges in the remainder of the combustion chamber from the burning fuel charges in the pocket.

7. In an internal combustion engine, the combination with a combustion chamber, of means for supplying successive air- and fuel-containing charges to said chamber for compression therein, said means having devices for varying the amount of fuel in said air- and fuel-containing charges, means for supplying to successive air-containing charges while under compression, successive fixed fuel charges under pressure, and means for igniting the successive combined charges while under compression.

8. The method of operating internal combustion engines which consists in adding a fuel charge of a fixed or constant amount to each successive compressed air and fuel containing charges in the combustion chamber of the engine, each of said added fuel charge being injected under pressure into the compressed air and fuel containing charges with and for which the added fuel charge is to be used, such injection of the fuel charge being in the immediate vicinity where ignition can be effected by the firing device of the engine, and igniting the combined charges by means of said firing device after such addition and while under compression in the combustion chamber.

9. In the operating of internal combustion engines having spark plug means for igniting the charge by sparking, the method which consists in adding fuel charges each of a fixed amount to successive compressed air and fuel containing charges in the combustion chamber of the engine, said added fuel charges being injected under pressure in the region which is directly under the influence of the sparking, igniting the combined charges by the sparking which is caused to take place after such addition and while the combined charges are under compression in the combustion chamber, and varying the proportions of fuel and air in the air and fuel containing charges to correspond to the varying power requirements of the engine.

10. The method of operating internal combustion engines having firing means for igniting the fuel and air charges which consists in adding successive fuel charges of fixed or constant amounts to successive compressed air and fuel containing charges in the combustion chamber of the engine, said added fuel charges being delivered into the combustion chamber in the immediate vicinity where the ignition is instigated by the firing means, igniting the combined charges by the functioning of the firing means after such addition and while under compression in the combustion chamber, and varying the amount of fuel in the air and fuel charges to correspond to the varying power requirements.

11. The method of operating internal combustion engines which consists in supplying to the combustion space of the engine two separate fuel charges, one of a fixed or constant amount to be introduced under compression, the other in variable amounts to be introduced simultaneously with the intake air, and igniting the combined charges while under compression by sparks produced in the locality into which the fixed fuel charge is delivered.

12. The method of operating internal combustion engines which consists in supplying to the combustion space thereof two separate fuel charges, one charge being of a fixed or constant amount and being introduced under compression in such a manner as to cause the same to remain in one locality in said combustion space, the other fuel charge being introduced to and with the incoming air in variable quantities depending upon the power requirements, which incoming air containing charge penetrates the entire combustion space, and igniting the combined charges in the neighborhood of the localized fixed or constant charge and while the combined charges are under compression.

13. An internal combustion engine having a casing providing a cylinder which with the movable reciprocating piston in the cylinder provides a combustion space that includes a main combustion chamber, which expands as the piston moves outwardly and which contracts as the piston moves inwardly during the successive reciprocatory movements of the piston, and an initial ignition pocket or auxiliary firing chamber which is constantly open to the main combustion chamber, said engine comprising means providing a main conduit by and through which air and fuel are supplied, according to increased load requirements, to and into the main combustion chamber, and also comprising means providing an ignition supply conduit leading to and delivering into the initial ignition pocket, said engine having means providing a fuel chamber within which there is maintained a supply of liquid ignition fuel, means for operating in accordance with the piston movements for positively conveying a measured quantity of liquid ignition fuel from said fuel chamber to and into said ignition supply conduit whereby a measured quantity of fuel will be conveyed by pressure to and into the initial ignition pocket, and means for operating in accordance with the piston movement for causing sparking within the initial ignition pocket whereby ignition of the fuel within the initial ignition pocket will follow as the result of the sparking.

14. An internal combustion engine as per claim 13 according to which the means whereby air and fuel are supplied according to increased load requirements is constructed so as to deliver the air, with the fuel entrained in the air, under compression into the main combustion chamber at a section near the piston when the piston is at or near the outward end of its intake stroke.

15. An initial combustion engine as per claim 13 according to which the means whereby air and fuel are supplied through the main conduit according to increased load requirements is constructed so as to deliver air, with fuel therein, under compression when the piston is at or near the outer end of its stroke, and according to which means for supplying ignition fuel to and into the ignition supply conduit delivers a constant quantity each time it functions.

16. An internal combustion engine as per claim 13 according to which the piston during its outward movement functions in conjunction with structures defining the crank shaft casing and associated parts to compress air and fuel entrained in the air, said engine having means providing the main conduit that leads from the interior of the crank casing to the interior of the main combustion chamber and arranged so that the compressed air with entrained fuel can flow into the main combustion chamber when the piston is at and near the outer end of its stroke.

NEIL O. BRODERSON.